US008677428B2

(12) United States Patent
Lewis et al.

(10) Patent No.: US 8,677,428 B2
(45) Date of Patent: Mar. 18, 2014

(54) SYSTEM AND METHOD FOR RULE BASED DYNAMIC SERVER SIDE STREAMING MANIFEST FILES

(75) Inventors: Jason Lewis, Issaquah, WA (US); William Watts, Seattle, WA (US); Peter Friedman, Kenmore, WA (US)

(73) Assignee: Disney Enterprises, Inc., Burbank, CA (US)

( * ) Notice: Subject to any disclaimer, the term of this patent is extended or adjusted under 35 U.S.C. 154(b) by 369 days.

(21) Appl. No.: 12/806,750

(22) Filed: Aug. 20, 2010

(65) Prior Publication Data

US 2012/0047542 A1 Feb. 23, 2012

(51) Int. Cl.
*H04N 7/173* (2011.01)
(52) U.S. Cl.
USPC .................... 725/91; 725/36; 725/97
(58) Field of Classification Search
USPC ................................. 725/91, 97, 36
See application file for complete search history.

(56) References Cited

U.S. PATENT DOCUMENTS

| 5,892,915 | A * | 4/1999 | Duso et al. | 709/219 |
|---|---|---|---|---|
| 6,978,306 | B2 * | 12/2005 | Miller et al. | 709/226 |
| 2005/0262245 | A1 * | 11/2005 | Menon et al. | 709/226 |
| 2007/0157231 | A1 * | 7/2007 | Eldering et al. | 725/35 |
| 2008/0244669 | A1 * | 10/2008 | Miner | 725/109 |
| 2009/0193473 | A1 * | 7/2009 | Moon et al. | 725/81 |
| 2009/0204901 | A1 * | 8/2009 | Dharmaji et al. | 715/745 |
| 2009/0254952 | A1 * | 10/2009 | Sridhar et al. | 725/92 |
| 2010/0050083 | A1 * | 2/2010 | Axen et al. | 715/726 |

* cited by examiner

Primary Examiner — Pankaj Kumar
Assistant Examiner — Sahar Baig
(74) Attorney, Agent, or Firm — Farjami & Farjami LLP (57) ABSTRACT

There is provided a system and method for rule-based dynamic server-side streaming manifest files. There is provided a method comprising receiving a request to provide a first video content for playback, evaluating a plurality of rules for the first video content, generating a dynamic manifest file referencing the first video content, and providing the dynamic manifest file in response to the request, thereby enabling an application to playback the first video content for output on a display by interpreting the dynamic manifest file. The rules may implement various features such as dynamic advertisement insertion, load balancing, client customization, user and device targeting, enhanced security mechanisms, global announcements, and others. As streaming protocols are widely supported by default on many client platforms, the dynamic manifest files can be utilized in a user friendly and transparent manner compared to client-side solutions requiring cumbersome client software installations.

18 Claims, 4 Drawing Sheets

SYSTEM AND METHOD FOR RULE BASED DYNAMIC SERVER SIDE STREAMING MANIFEST FILES

BACKGROUND OF THE INVENTION

1. Field of the Invention

The present invention relates generally to media playback. More particularly, the present invention relates to media playback using dynamic manifest files.

2. Background Art

Streaming platforms based on widely supported protocols such as Hypertext Transfer Protocol (HTTP), Internet Protocol (IP) multicast and peer to peer (P2P) streaming allow content producers to continue harnessing standard web delivery technologies for streamlined implementation using existing infrastructure, avoiding the need to develop and implement new data streaming protocols. As a result, such streaming platforms are seeing widespread adoption, with supporting player applications built for a wide range of operating systems and devices. By utilizing applications based on widely supported streaming protocols, users can enjoy live or recorded video content streamed conveniently to their favorite media consumption devices, whether it be a laptop or desktop computer, a mobile phone, a video game console, a digital video recorder, a set top box, or another network enabled media device.

Conventionally, many streaming platforms rely on a manifest file retrieved as a static playlist file from a web host. Thus, it is difficult to provide dynamic content where the contents of the manifest file may change. Moreover, the manifest file must be strictly sequential and provides no mechanisms for conditional logic or implementing business rules. This lack of flexibility makes it difficult to provide desirable features such as dynamic advertisement insertion, load balancing, client customization, user and device targeting, enhanced security mechanisms, and other features to more flexibly meet the needs of advertisers and content producers. For example, advertisers may want to use demographic information and user profile information to provide targeted advertising customized for each viewer, which is not possible if streaming media playback is only by a static and sequential manifest file.

Client side dynamic media streaming player applications may be provided to implement conditional logic and business rules. However, one of the most compelling features of streaming media is the capability for users to stream from many different media devices due to the widespread support of streaming protocols. As a result, a dynamic client side solution may necessitate significant development and maintenance costs to provide customized streaming applications for each major client platform, preventing cost effective implementation and deployment. Moreover, users may be required to search, download, and update dynamic media streaming applications for each individual device. This process may be inconvenient for many users, and the installation or updating of applications may be restricted in public or corporate environments.

Accordingly, there is a need to overcome the drawbacks and deficiencies in the art by providing flexible dynamic streaming media in a cost effective manner that is convenient and transparent for end users.

SUMMARY OF THE INVENTION

There are provided systems and methods for rule-based dynamic server-side streaming manifest files, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for rule-based dynamic server-side streaming manifest files. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
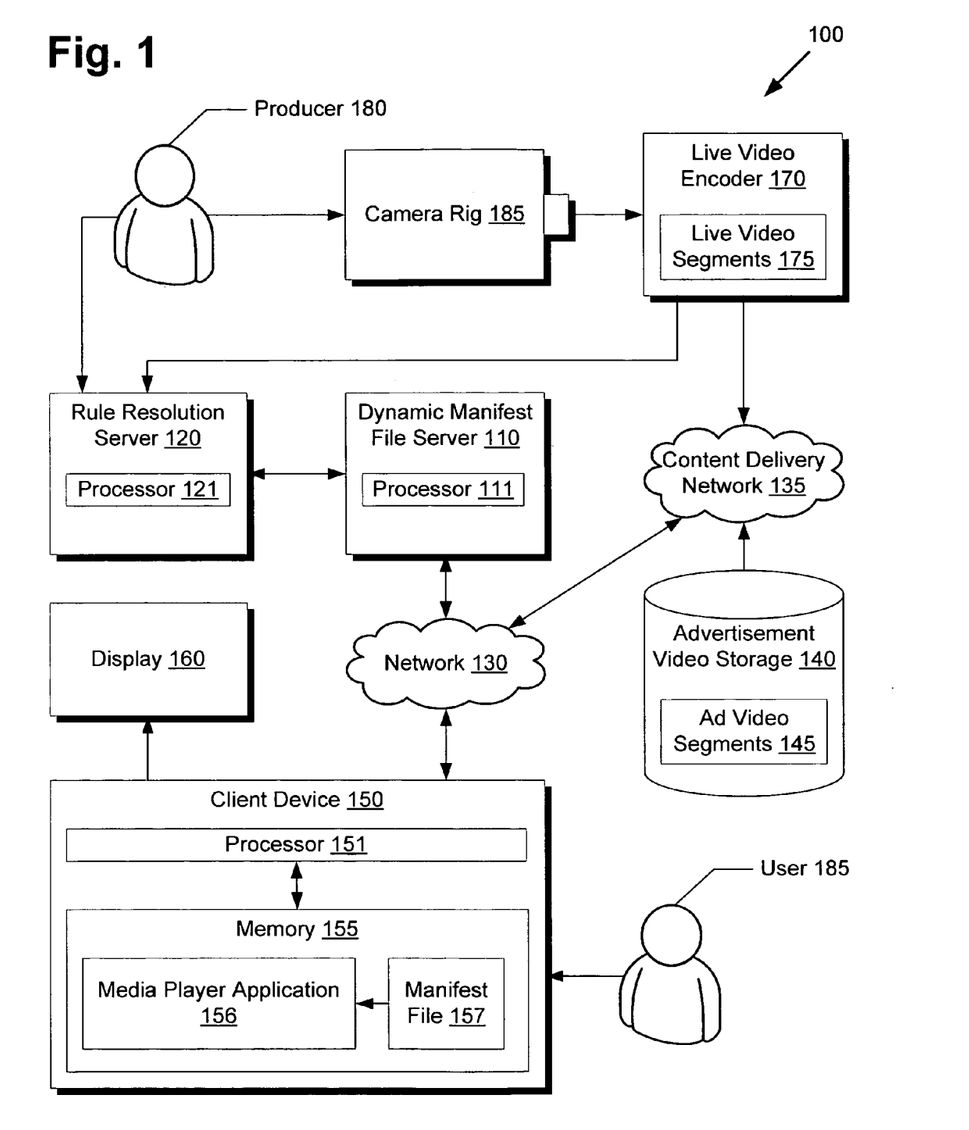
FIG. 1 presents a diagram of a system for providing rule-based dynamic server-side streaming manifest files, according to one embodiment of the present invention.

FIG. 1 presents a diagram of a system for providing rule-based dynamic server-side streaming manifest files, according to one embodiment of the present invention. Diagram 100 of FIG. 1 includes producer 180, camera rig 185, live video encoder 170, rule resolution server 120, dynamic manifest file server 110, content delivery network 135, display 160, network 130, advertisement video storage 140, client device 150, and user 185. Live video encoder 170 includes live video segments 175. Rule resolution server 120 includes processor 121. Dynamic manifest file server 110 includes processor 111. Advertisement video storage 140 includes ad video segments 145. Client device 150 includes processor 151 and memory 155. Memory 155 includes media player application 156 and manifest file 157.

As shown in diagram 100 of FIG. 1, producer 180 may direct camera rig 185 to record live footage, such as a live event, to be streamed to users such as user 185. Camera rig 185 may then record and send live video footage to live video encoder 170, which may then encode the live video footage in real-time into live video segments 175. For example, the live video footage may be encoded into MPEG transport stream (TS) fragment files of a fixed length, such as 10 seconds, for ease of distribution using streaming protocols such as HTTP streaming, IP multicast, P2P streaming. As new live footage is captured and approved, new video segments may be encoded and stored within live video segments 175, which may then be distributed over content delivery network 135. Content delivery network 135 may, for example, comprise a network of servers for storage and distribution of media content. Live video encoder 170 may also provide rule resolution server 120 with an updated list of references for accessing live video segments 175 through content delivery network 135, which may then be passed to dynamic manifest file server 110 for generating manifest file 157. Producer 180 may provide specific rules to rule resolution server 120 to customize the generation of manifest file 157, such a rule to insert advertising segments to overwrite a particular time block in the live stream.

As shown in diagram 100, a client device 150 may send a request to dynamic manifest file server 110 for live video content. Client device 150 may comprise a laptop or desktop computer, a mobile phone, a video game console, a digital video recorder, a set top box, or another network enabled media device. User 185 may direct client device 150 to execute media player application 156, for example by clicking on an application icon shown on display 160. Media player application 156 may comprise, for example, a web browser. User 185 may navigate to a video streaming portal site accessible over network 130 to click on a link directed to dynamic manifest file server 110 for access to live video stream content. Media player application 156 may then send a request, such as a HTTP GET request over network 130 to dynamic manifest file server 110. Dynamic manifest file server 110 may then forward various parameters received from the request originating from client device 150 to rule resolution server 120. Client device 150 may also explicitly send parameter data to dynamic manifest file server 110 voluntarily or in response to a request for client parameters. Dynamic manifest file server 110 may then utilize rule resolution server 120 to evaluate various business rules and create a dynamically tailored manifest file accordingly, which may then be passed back to client device 150 over network 130 and placed into memory 155 as manifest file 157, as shown in FIG. 1.

Media player application 156 may then interpret manifest file 157 to playback video content on display 160. For example, manifest file 157 may reference live video segments 175 and ad video segments 145 on servers hosted in content delivery network 135, accessible over network 130. Thus, manifest file 157 may comprise a playlist file such as a M3U8 playlist file. Media player application 156 may then request, stream, decode, and output the referenced video segments seamlessly to display 160 to playback the requested live video stream for user 185. As camera rig 185 captures new live footage and live video encoder 170 adds new segments to live video segments 175, media player application 156 can periodically request an updated manifest file 157 from dynamic manifest file server 110. Producer 180 may dynamically add new rules to rule resolution server 120, for example to schedule advertising blocks. Rule resolution server 120 may then direct dynamic manifest file server 110 to switch to advertising content at specific time blocks specified by the new rules added by producer 180.

While the example system shown in diagram 100 of FIG. 1 is directed towards a live content streaming embodiment with advertisement insertion, the rule based dynamic server-side streaming manifest files provided by dynamic manifest file server 110 may also be utilized for alternative embodiments and use cases. For example, pre-recorded content may be provided rather than live content. If the pre-recorded content has existing advertising blocks, then rules may be provided at rule resolution server 120 to replace the existing advertising blocks, facilitating the reuse of existing video segments without re-encoding. Rules evaluated by rule resolution server 120 may also be directed towards other functions besides advertisement insertion, such as enhanced security, video content customization, client or user targeting, geographic or region targeting, content delivery network load balancing, priority broadcasts for concurrent playback, and other functions. Moreover, diagram 100 only depicts one simplified exemplary implementation for clarity. Alternative embodiments may, for example, combine, separate, or duplicate certain components and functions shown in diagram 100. For example, dynamic manifest file server 110 and rule resolution server 120 may be combined into a single server, multiple servers may be utilized for load balancing to multiple client devices, multiple content delivery networks may be utilized for higher quality of service, and several different video streams may be offered for streaming.

Figure 2:
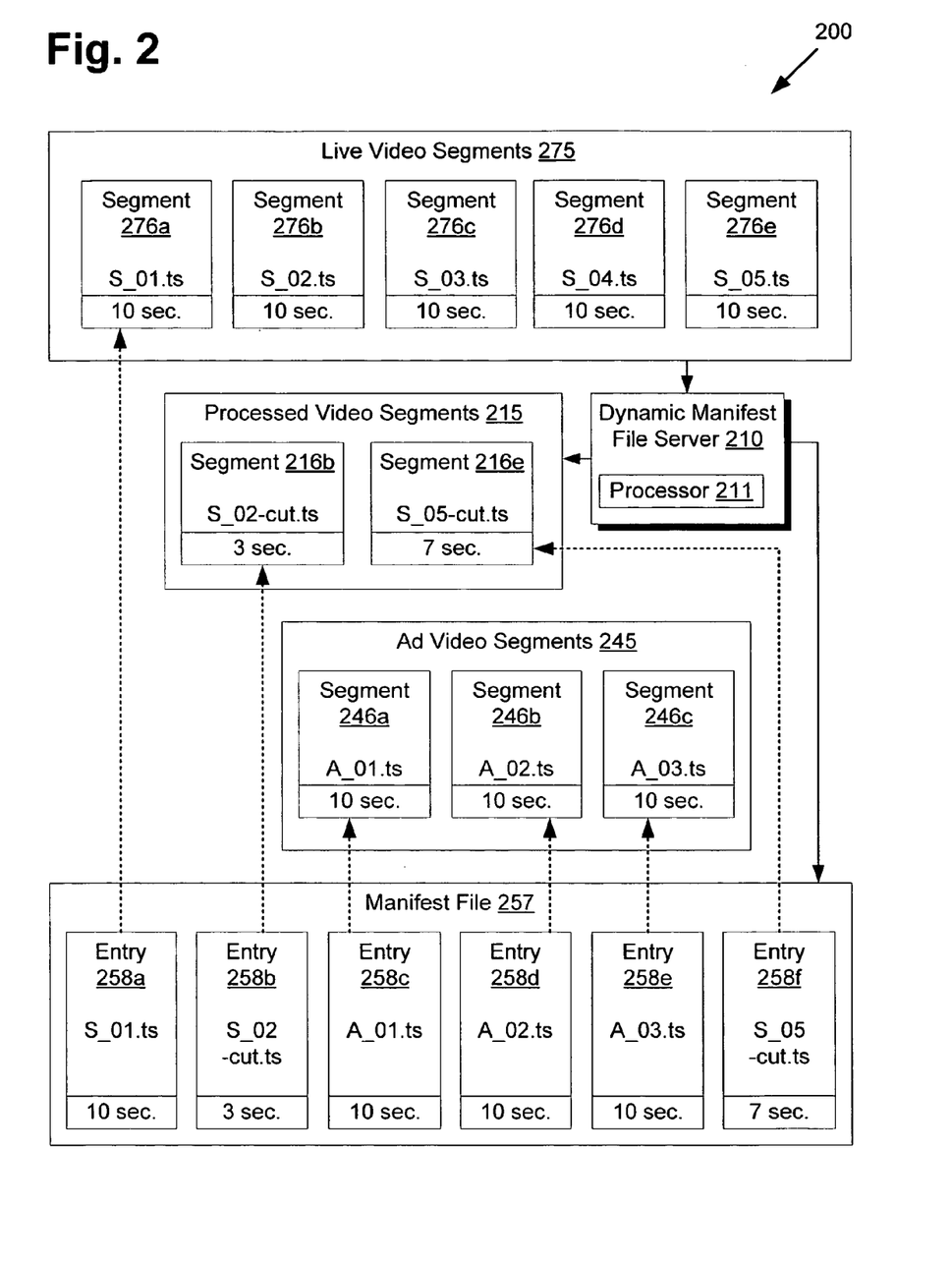
FIG. 2 presents a diagram of a system for using rule-based dynamic server-side streaming manifest files to implement dynamic in-stream advertisements, according to one embodiment of the present invention.

Moving to FIG. 2, FIG. 2 presents a diagram of a system for using rule-based dynamic server-side streaming manifest files to implement dynamic in-stream advertisements, according to one embodiment of the present invention. Diagram 200 of FIG. 2 includes live video segments 275, processed video segments 215, dynamic manifest file server 210, ad video segments 245, and manifest file 257. Live video segments 275 include segments 275a through 275e. Processed video segments 215 include segments 216b and 216e. Dynamic manifest file server 210 includes processor 211. Ad video segments 245 include segments 246a through 246c. Manifest file 257 includes entries 258a through 258f. With regards to FIG. 2, it should be noted that live video segments 275 may correspond to live video segments 175 from FIG. 1, that dynamic manifest file server 210 may correspond to dynamic manifest file server 110 from FIG. 1, that ad video segments 245 may correspond to ad video segments 145 from FIG. 1, and that manifest file 257 may correspond to manifest file 157 from FIG. 1.

As previously discussed, media files may be encoded and segmented into fragment files of a fixed length to facilitate integration with streaming platforms. Thus, as shown in FIG. 2, live video segments 275 may be prepared as successive ten second segments, shown as segments 276a through 276e. Similarly, ad video segments 245 are also prepared as three ten second segments, or segments 246a through 246c, which may comprise one complete thirty second commercial. As additional live footage is recorded and encoded into new segments, the new segments may be appended within live video segments 275.

Dynamic manifest file server 210 may then dynamically create manifest file 257 referencing live video segments 275 and ad video segments 245. For example, as previously described, producer 180 may provide a rule to rule resolution server 120 specifying a time block to switch to a commercial, such as thirteen (13) seconds into the live broadcast. However, since live video segments 275 are fragmented into ten second segments, an insertion of advertisement content may only be supported at ten second intervals since many standard manifest file formats do not support offset playback of segments. Thus, if commercial playback is desired at an offset of thirteen seconds, insertion must be delayed until the twenty second offset, resulting in dead time while waiting for the segment to finish.

To avoid such dead time, dynamic manifest file server 210 may be configured to generate processed video segments 215, which may be preferably directly stream copied from the original sources and trimmed accordingly, or alternatively trimmed and re-encoded if direct stream copies are not feasible. Assuming a rule specifying commercial insertion at thirteen seconds for ad video segments 245 running at thirty seconds, segments 216b and 216e may thus be created from segments 276b and 276e, respectively. More specifically, segment 216b may comprise the first three seconds of segment 276b, and segment 216e may comprise the last seven seconds of segment 276e. Processed video segments 215 may then be referenced accordingly instead of the original live video segments 275, allowing advertisement or other content insertion at any desired playback offset or position without dead time. For pre-recorded content where it is desirable not to discard any of the original video content, dynamic manifest file server 210 may be configured to continue referencing the original video segments even after insertion of advertising.

Thus, dynamic manifest file server 210 may generate manifest file 257, with entry 258a referencing original segment 276a, entry 258b referencing processed segment 216b, entries 258c through 258e referencing segments 246a through 246c respectively, and entry 258f referencing processed segment 216e. When entries 258a through 258f are played back successively without gaps by a media player application, the result is an advertisement smoothly integrated into a live stream with no interruptions or dead time. Since additional rules may be specified, for example to provide targeted advertising based on user tracking profiles, client device profiles, geographic regions, and other parameters, highly targeted advertising is possible even in live streaming embodiments.

Figure 3:
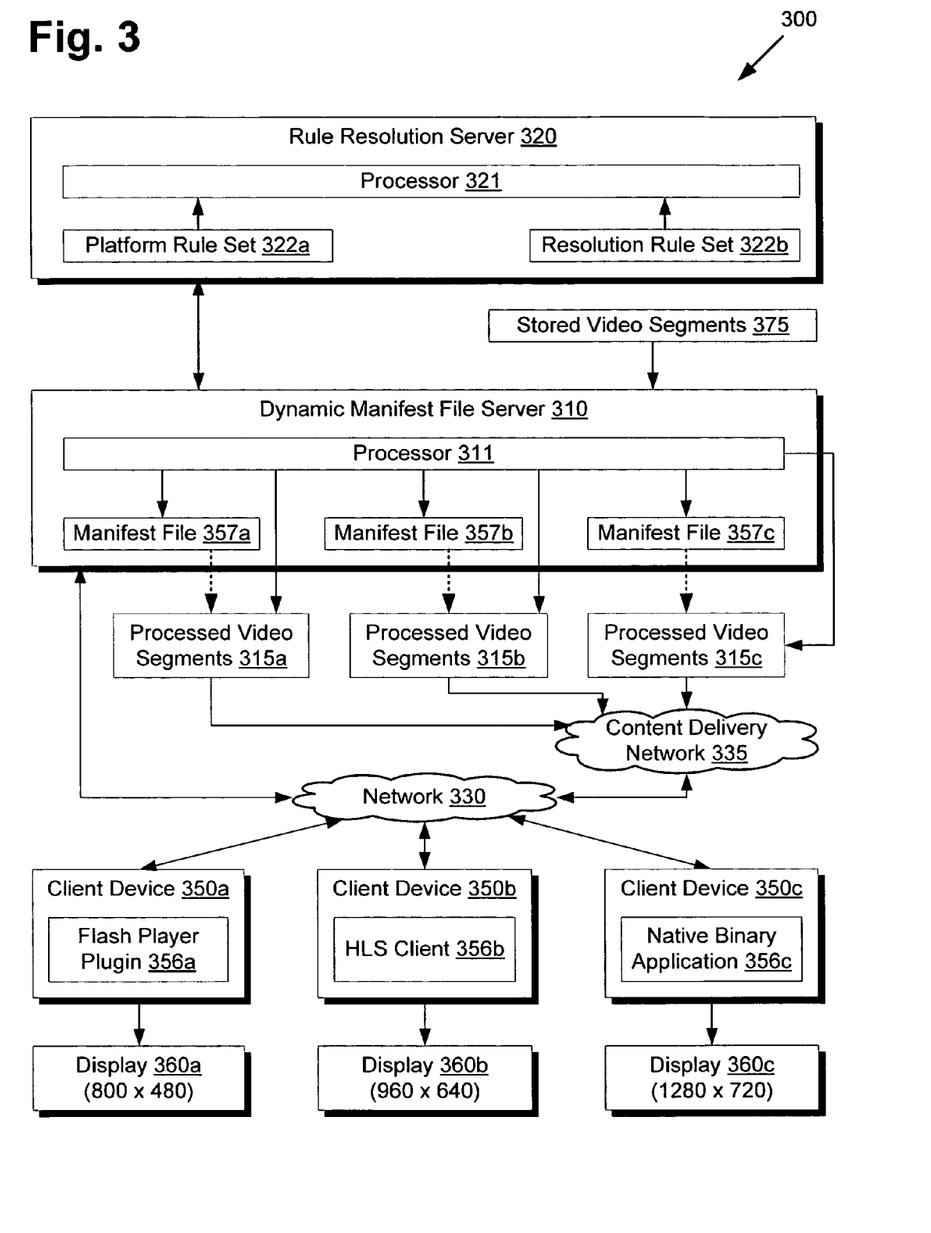
FIG. 3 presents a diagram of a system for using rule-based dynamic server-side streaming manifest files to implement stream targeting for client devices, according to one embodiment of the present invention.

Moving to FIG. 3, FIG. 3 presents a diagram of a system for using rule-based dynamic server-side streaming manifest files to implement stream targeting for client devices, according to one embodiment of the present invention. Diagram 300 of FIG. 3 includes rule resolution server 320, stored video segments 375, dynamic manifest file server 310, processed video segments 315a through 315c, content delivery network 335, network 330, client devices 350a through 350c, and displays 360a through 360c. Rule resolution server 320 includes processor 321, platform rule set 322a, and resolution rule set 322b. Dynamic manifest file server 310 includes processor 311 and manifest files 357a through 357c. Client device 350a includes Flash player plugin 356a. Client device 350b includes HTTP Live Streaming or HLS client 356b. Client device 350c includes native binary application 356c. With respect to FIG. 3, it should be noted that rule resolution server 320 may correspond to rule resolution server 120 of FIG. 1, that dynamic manifest file server 310 may correspond to dynamic manifest file server 110 from FIG. 1, that processed video segments 315a through 315c may each correspond to processed video segments 215 of FIG. 2, that content delivery network 335 may correspond to content delivery network 135 of FIG. 1, that network 330 may correspond to network 130 of FIG. 1, that client devices 350a through 350c may each correspond to client device 150 of FIG. 1, and that displays 360a through 360c may each correspond to display 160 of FIG. 1.

While FIGS. 1 and 2 illustrate an advertisement insertion embodiment, FIG. 3 illustrates client or device targeting, wherein video content is processed and customized according to particular client device parameters. As shown in FIG. 3, dynamic manifest file server 310 provides manifest files for a diverse range of client device platforms, including Flash Player plugin 356a at client device 350a, HTTP Live Streaming client 356b at client device 350b, and native binary application 356c at client device 356c. Platform rule set 322a may include various rules as how to customize video content based on the target device platform to be supported. Additionally, displays 360a, 360b, and 360c each utilize different screen resolutions to display video content, and resolution rule set 322b may include various rules as how to resize video content based on the target display resolution.

For example, for client device 350a, platform rule set 322a may dictate that if a request originates from a client device indicating Flash Player plug-in support, then dynamic manifest file server 310 should preferably generate a F4M Flash Zeri manifest file, or manifest file 357a, referencing F4F Flash video files, or processed video segments 315a. Processed video segments 315a may be encoded from stored video segments 375, and may be resized and cropped according to resolution rule set 322b to optimally fit the 800 by 480 resolution provided by display 360a. Thus, when client device 350a requests video content represented by stored video segments 375, dynamic manifest file server 310 may provide manifest file 357a in the Flash Zeri HTTP streaming format for facilitated playback by Flash Player plugin 356a. Flash Player plugin 356a may then access the referenced video content in processed video segments 315a over network 330 via content delivery network 335.

Moving to client device 350b, platform rule set 322a may dictate that if a request originates from a client device indicating HLS or HTTP Live Streaming support, then dynamic manifest file server 310 should preferably generate a M3U8 manifest file, or manifest file 357b, referencing MPEG transport stream video files, or processed video segments 315b. Processed video segments 315b may be encoded from stored video segments 375, and may be resized and cropped according to resolution rule set 322b to optimally fit the 960 by 640 resolution provided by display 360b. Thus, when client device 350b requests video content represented by stored video segments 375, dynamic manifest file server 310 may provide manifest file 357b in the HTTP Live Streaming format for facilitated playback by HLS client 356b. HLS client 356b may then access the referenced video content in processed video segments 315b over network 330 via content delivery network 335.

Moving to client device 350c, platform rule set 322a may dictate that if a request originates from a set top box running a native binary application, then dynamic manifest file server 310 should preferably generate a M3U8 manifest file, or manifest file 357c, referencing MPEG transport stream video files, or processed video segments 315c. Processed video segments 315c may be encoded from stored video segments 375, and may be resized and cropped to optimally fit the 1280 by 720 resolution provided by display 360c. Thus, when client device 350c requests video content represented by stored video segments 375, dynamic manifest file server 310 may provide manifest file 357c as a standard M3U8 playlist for facilitated playback by native binary application 356c. Native binary application 356c may then access the referenced video content in processed video segments 315c over network 330 via content delivery network 335.

Thus, dynamic manifest file 310 and rule resolution server 320 may target specific client platforms to provide the optimal format for the manifest files and the processed video segments, and may also resize and process video for the best appearance on the specific display for each client device. While display resolution is shown as one example display parameter, other display parameters may also be considered such as color space or gamut, color bit-depth, refresh rate, and other parameters. Thus, as one example, rule resolution server 320 may include a color space conversion rule to adjust video colors to the color space of a targeted display. Another example rule may comprise a framerate conversion rule converting video framerates to adjust to specific refresh rates of a targeted display, or downsampling three-dimensional stereoscopic video intended for three-dimensional displays into two-dimensional video for standard two-dimensional displays. To provide faster response time for client devices, video for the most common client configurations may be pre-processed and cached in advance. Additionally, multiple bit-rate streams may be encoded and referenced in the generated manifest files to allow graceful degradation to lower bit-rate video in response to adverse network conditions.

In addition to preparing video content for optimal presentation quality, substantive content such as advertising content may also be targeted and prepared based on various parameterized rules evaluated by rule resolution server 320. Thus, for example, a user tracking profile associated with client device 350*a* may be analyzed to formulate a targeted advertising campaign for manifest file 357*a*, adding appropriate pre-roll, post-roll, and mid-roll advertising content estimated to be most relevant and interesting for the user of client device 350*a*. The geographic location or region of client device 350*a* may also be detected, for example through GPS tracking or geo-IP address look-up, and advertising may be adjusted accordingly for the detected region, for example by selecting from a regional advertising campaign. The detected region may also affect the requested substantive content, for example by configuring processed video segments 315*a* to include subtitles or a dubbed language track based on the detected region.

Besides advertisement insertion and user or client device targeting, rule resolution server 320 may also implement a wide variety of other rules to enhance, target, and customize the video streaming experience for the end user. For example, one rule may rewrite the URLs within a manifest file to point to the content delivery network in closest proximity to the client device, providing improved network performance and responsiveness. The proximity rule may be overridden or supplemented by another rule implementing client load balancing parameters, for example by steering users to content delivery networks with greater free user capacity. Another rule may implement enhanced security features, such as limiting or granting access or providing keys based on time windows or rental periods, HTTP cookie or login status, client device identification, or other criteria. For example, if the enhanced security checks fail, then the client may be redirected to a video showing how the user can remedy any failed security checks.

Other rules may provide features desirable for content creators and network administrators. For example, one rule may insert a high priority video segment into multiple manifest files for a specific group of clients or for all clients globally. Thus, for example, administrators can provide important news bulletins, alerts, or other high priority video to the displays of multiple clients concurrently. Content providers may also use such global notifications to advertise or promote specific content to all streaming clients regardless of the particular stream each client is watching. Since such global notifications may be configured to display concurrently on many different clients, viral effects, social interaction, and positive word of mouth may be encouraged.

Advantageously, since manifest files 357*a* through 357*c* are generated at the server side, no custom client-side applications are necessary. Thus, the system shown in diagram 300 of FIG. 3 operates transparently to provide dynamic manifest files without requiring any special intervention from the end user, such as searching, installing, and updating a custom client-side player application. Each client device 350*a* through 350*c* only needs to support at least one implementation of streaming using manifest files, whether the implementation is through a Flash Player plugin, through a HLS enabled web browser, or through another implementation such as a native binary application. Often, these implementations are already built into default platform installations or are otherwise easily accessible from application stores or original installation media, allowing users to immediately access and enjoy dynamic streaming video media enabled by dynamic manifest file server 310. This may be a key advantage for users browsing from public locations or corporate environments, where application administration privileges for end users may be limited or restricted.

Figure 4:
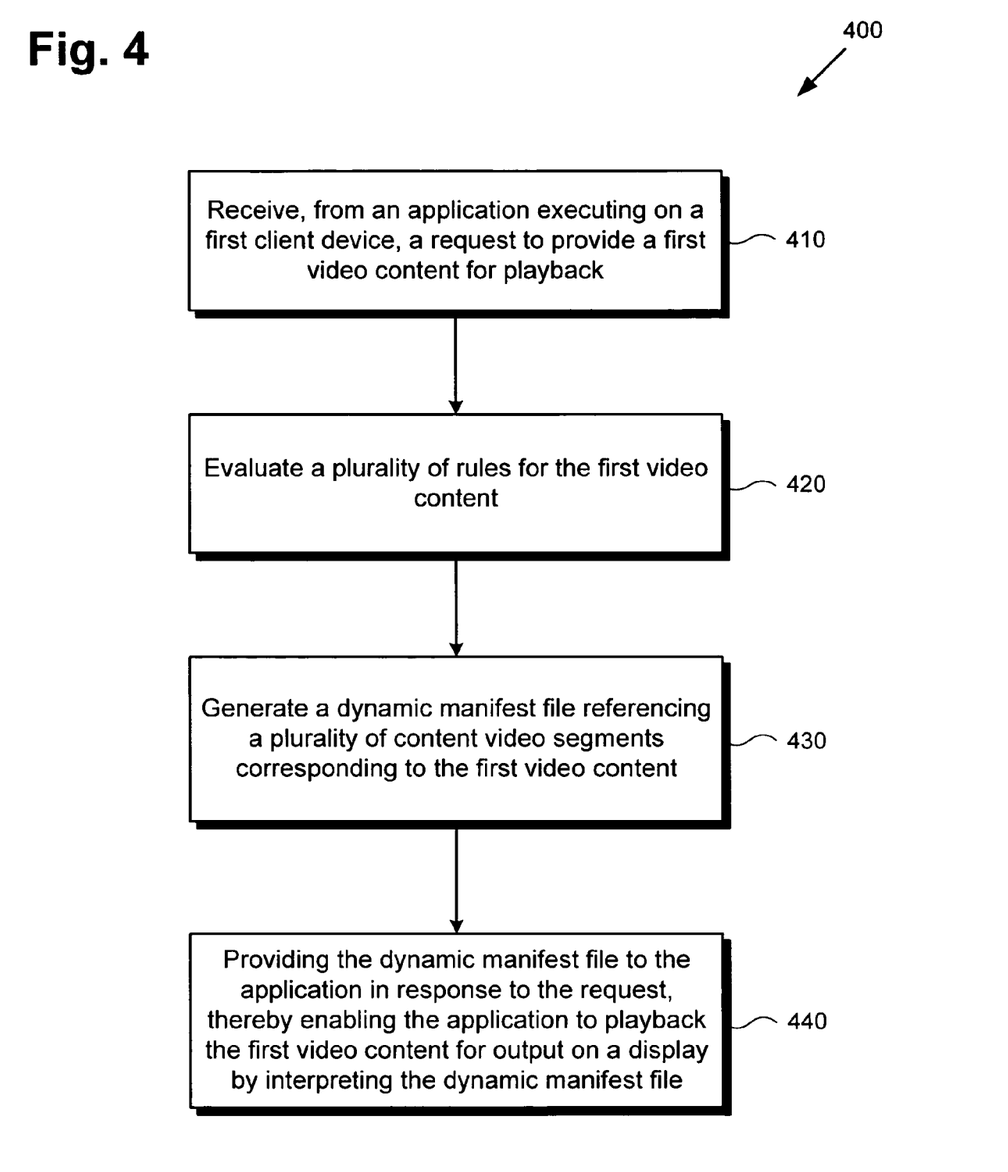
FIG. 4 shows a flowchart describing the steps, according to one embodiment of the present invention, by which rule-based dynamic server-side streaming manifest files may be provided.

Moving to FIG. 4, FIG. 4 shows a flowchart describing the steps, according to one embodiment of the present invention, by which rule-based dynamic server-side streaming manifest files may be provided. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises processor 111 of dynamic manifest file server 110 receiving, from media player application 156 executing on processor 151 of client device 150, a request to provide a first video content for playback. For example, media player application 156 may comprise a HLS enabled web browser. User 185 may then use media player application 156 to navigate to a website presenting a list of available live video streams. After user 185 selects a live stream corresponding to a live event being captured by camera rig 185, a request for the live stream, such as a HTTP GET request, may be sent over network 130 to dynamic manifest file server 110.

Referring to step 420 of flowchart 400 in FIG. 4 and diagram 100 of FIG. 1, step 420 of flowchart 400 comprises processor 111 of dynamic manifest file server 110 passing parameters from the request received in step 410 to rule resolution server 120, which may then evaluate a plurality of rules for the live event requested in step 410. Thus, parameter data from the HTTP GET request and other platform parameters of client device 150 that may be retrieved automatically, such as by scripting, or voluntarily, such as from user form data, may all be passed to rule resolution server 120 for further evaluation. These parameters may include details such as the client IP address, browser or operating platform, device identifiers, browser cookies or login details, screen resolution of display 160, and other device, display, or user parameters, which may then be evaluated against a plurality of rules as applied to live video segments 175. For example, processor 121 of rule resolution server 120 may evaluate a dynamic advertisement insertion rule dictating specific advertisements and time blocks for substituting ad video segments 145 within live video segments 175 when generating manifest file 157. Producer 180 may generate such insertion rules in real-time for rule resolution server 120, allowing the dynamic insertion of advertisement time blocks or other content while a live event is in progress. Additional rules may further customize the final manifest file, as for example platform rule set 322*a* and resolution rule set 322*b* shown in FIG. 3, which may be used to optimize video delivery for specific devices and display configurations.

Additionally, if any of the rules require the insertion of content at a time offset starting or ending within a video segment, then a cutting or cropping processing procedure may be carried out with the affected video segments so that the generated manifest file can insert the content at any playback offset. For example, as shown in diagram 200 of FIG. 2, processor 211 of dynamic manifest file server 210 may generate processed video segments 215 from live video segments 275 to allow the insertion of ad video segments 245 at 0:00:13 or the thirteen second playback offset within manifest file 257. Thus, by adjusting the cutting procedure for generating processed video segments 215 accordingly, ad video segments 245 can be precisely referenced at any arbitrary playback offset within manifest file 257. A direct stream copy and cutting procedure may be preferred to preserve the original video encoding quality, but alternative embodiments may re-encode to create processed video segments 215. While re-encoding may result in some video quality degradation, such a process may be necessary due to, for example, specialized video codecs or compression methods, or to add certain processing effects such as cross-fading, subtitles, resolution resampling, or audio dubbing.

Referring to step 430 of flowchart 400 in FIG. 4 and diagram 100 of FIG. 1, step 430 of flowchart 400 comprises processor 111 of dynamic manifest file server 110 generating manifest file 157 referencing live video segments 175 corresponding to the live event stream requested in step 410. A specific host server or network of host servers may be referenced within manifest file 157, such as content delivery network 135. Additionally, the evaluation of the rules in step 420 may further affect the generation of manifest file 157. For example, assuming the evaluation of an advertisement insertion rule in step 420, step 430 may further reference ad video segments 145 and processor 111 may also perform video cutting processing to live video segments 175 to facilitate smooth insertion of ad content at a desired playback offset without dead time, as illustrated in the process shown in diagram 200 of FIG. 2. To provide another example, the evaluation of rules such as platform rule set 322a and resolution rule set 322b shown in diagram 300 of FIG. 3 may further direct processor 111 to process live video segments 175 for optimal video quality depending on the requesting client device. Thus, for example, if the request received from step 410 identifies client device 150 as a HLS enabled web browser and display 160 as a screen with a 960 by 640 pixel resolution, then live video segments 175 and ad video segments 145 may be correspondingly resized to optimally fit within the target 960 by 640 pixel resolution, manifest file 157 may be provided as a M3U8 file, and each of the referenced video segments may comprise a MPEG-2 transport stream (.TS) file, in accordance with HLS platform requirements.

Referring to step 440 of flowchart 400 in FIG. 4 and diagram 100 of FIG. 1, step 440 of flowchart 400 comprises processor 111 of dynamic manifest file server 110 providing, in response to the request received in step 410, manifest file 157 to media player application 156 executing on processor 151 of client device 150, thereby enabling media player application 156 to playback the live event captured by camera rig 185 for output on display 160 by interpreting manifest file 157. For example, assuming manifest file 157 was generated in step 430 to reference both live video segments 175 and ad video segments 145, media player application 156 can download the referenced segments over network 130 via content delivery network 135, which may then be decoded and output to display 160 for viewing by user 185. Moving to diagram 200 of FIG. 2, the contents of manifest file 157 may appear similar to manifest file 257, comprising a list of playlist entries referencing video segments to be played gapless and in sequence.

As in diagram 100 of FIG. 1, if the requested stream is a live stream rather than pre-recorded content, additional content video segments may be continually added to live video segments 175. Dynamic manifest file server 110 may then reference these additional segments when creating new dynamic manifest files. If the number of referenced segments becomes too large, then the number of entries within the playlist may be restricted, for example to the most recent 10 entries only. Media player application 156 may then periodically request and retrieve an updated manifest file 157 from dynamic manifest file server 110. Media player application 156 may then reinterpret the newly received manifest file 157 to continue streaming new live video footage. Additionally, new rules may be provided at rule resolution server 120 to further customize manifest file 157 as the live event progresses. For example, producer 180 may continually generate new rules to queue advertising blocks at specific times during the live stream. In this manner, flexible advertisement insertion and other dynamic features can be provided even for live streaming events.

Moreover, as previously discussed, some rules may be provided that allow high priority video to be displayed globally or for a select group of clients. Thus, moving to diagram 300 of FIG. 3 for example, assuming that client devices 350a through 350c each specify a different video stream from stored video segments 375, a rule stored in rule resolution server 320 may specify that globally all clients should playback a high priority video segment at a specified time, such as 8:00 PM PST. Accordingly, processor 311 of dynamic manifest file server 310 may modify any generated manifest files such as manifest files 357a through 357c to reference the high priority video segment instead of the requested video content if the current time matches 8:00 PM PST. Thus, even if client devices 350a through 350c are watching completely different content, displays 360a through 360c may all concurrently display the same high priority video segment at 8:00 PM PST. As previously described, this may be used for news, alerts, promotions, or for other purposes. Since all streaming clients may view the same high priority video segment on their respective displays, viral effects and social interaction may be encouraged through a shared audience experience. When used judiciously, this global announcement feature may generate strong positive impact for promotional campaigns.

Thus, it can be observed that server-side dynamic manifest files can provide flexible methods of customizing video streaming content without requiring users to install cumbersome client-side player application software. Since the dynamic manifest files can provide playback for widely available streaming platforms such as HLS enabled web browsers and the Flash Player plug-in, the solution can be deployed to the vast majority of existing clients in a user friendly and transparent manner. By utilizing existing video resources to the greatest extent possible and by automatically generating custom content according to specified business rules, much of the tedious labor and cost of manual editing is eliminated, providing significant cost savings to content providers while improving the user experience with highly targeted and optimized video streams.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A server for providing rule-based dynamic server-side streaming manifest files to enable flexible video playback, the server comprising:
a processor configured to:
receive, from an application executing on a first client device, a request to provide a first video content for playback;
request a client device parameter from the first client device;
evaluate a plurality of rules for the first video content;
generate, according to the plurality of rules, a dynamic manifest file referencing a plurality of content video segments for the application to stream, the plurality of content video segments corresponding to the first video content;
provide the dynamic manifest file to the application in response to the request for enabling the application to playback the first video content for output on a display by interpreting the dynamic manifest file;
wherein the plurality of rules include processing the plurality of content video segments according to the client device parameter.

2. The server of claim 1, wherein the plurality of rules further include processing the plurality of content video segments according to a display parameter.

3. The server of claim 1, wherein the plurality of rules further include specifying a content delivery network hosting the plurality of content video segments according to load balancing parameters applied to the first client device, and wherein the processor is further configured to generate the dynamic manifest file by referencing the specified content delivery network.

4. The server of claim 1, wherein the plurality of rules further include selecting a plurality of advertisement video segments for the first client device, and wherein the processor is further configured to generate the dynamic manifest file by further referencing the plurality of advertisement video segments.

5. The server of claim 4, wherein the selecting is by evaluating a user tracking profile associated with the first client device.

6. The server of claim 4, wherein prior to generating the dynamic manifest file the processor is further configured to:
process the plurality of video segments by cutting one or more of the plurality of video segments such that the dynamic manifest file is enabled to reference each of the plurality of advertisement video segments at any playback offset.

7. The server of claim 1, wherein the processor is further configured to:
update the dynamic manifest file to reference additional content video segments comprising live video content for enabling the application to live stream video content for output on the display by periodically retrieving and reinterpreting the dynamic manifest file.

8. The server of claim 1, wherein the dynamic manifest file comprises a playlist in the M3U8 format, and wherein the plurality of content video segments comprise MPEG transport stream (TS) file fragments.

9. The server of claim 1, wherein the processor is further configured to:
receive a request to provide a plurality of priority video segments for playback on a plurality of client devices;
modify a plurality of dynamic manifest files associated with the plurality of client devices to reference the plurality of priority video segments; and
provide the plurality of dynamic manifest files to the plurality of client devices for enabling concurrent playback of the plurality of priority video segments for output on a plurality of displays associated with the plurality of client devices.

10. A method for providing rule-based dynamic server-side streaming manifest files to enable flexible video playback, the method comprising:
receiving, from an application executing on a first client device, a request to provide a first video content for playback;
requesting a client device parameter from the first client device;
evaluating a plurality of rules for the first video content;
generating, according to the plurality of rules, a dynamic manifest file referencing a plurality of content video segments for the application to stream, the plurality of content video segments corresponding to the first video content; and
providing the dynamic manifest file to the application in response to the request for enabling the application to playback the first video content for output on a display by interpreting the dynamic manifest file;
wherein the plurality of rules include processing the plurality of content video segments according to the client device parameter.

11. The method of claim 10, wherein the plurality of rules further include processing the plurality of content video segments according to a display parameter.

12. The method of claim 10, wherein the plurality of rules further include specifying a content delivery network hosting the plurality of content video segments according to load balancing parameters applied to the first client device, and wherein the generating of the dynamic manifest file further comprises referencing the specified content delivery network.

13. The method of claim 10, wherein the plurality of rules further include selecting a plurality of advertisement video segments for the first client device, and wherein the generating of the dynamic manifest file further comprises referencing the plurality of advertisement video segments.

14. The method of claim 13, wherein the selecting is by evaluating a user tracking profile associated with the first client device.

15. The method of claim 13 further comprising prior to the generating of the dynamic manifest file:
processing the plurality of video segments by cutting one or more of the plurality of video segments such that the dynamic manifest file is enabled to reference each of the plurality of advertisement video segments at any playback offset.

16. The method of claim 10 further comprising:
updating the dynamic manifest file to reference additional content video segments comprising live video content for enabling the application to live stream video content for output on the display by periodically retrieving and reinterpreting the dynamic manifest file.

17. The method of claim 10, wherein the dynamic manifest file comprises a playlist in the M3U8 format, and wherein the plurality of content video segments comprise MPEG transport stream (TS) file fragments.

18. The method of claim 10 further comprising:
- receiving a request to provide a plurality of priority video segments for playback on a plurality of client devices;
- modifying a plurality of dynamic manifest files associated with the plurality of clients to reference the plurality of priority video segments; and
- providing the plurality of dynamic manifest files to the plurality of client devices for enabling concurrent playback of the plurality of priority video segments for output on a plurality of displays associated with the plurality of client devices.

* * * * *